United States Patent [19]

Swenson

[11] Patent Number: 5,519,846
[45] Date of Patent: May 21, 1996

[54] MULTIPROCESSOR SYSTEM WITH SCHEME FOR MANAGING ALLOCATION AND RESERVATION OF CACHE SEGMENTS IN A CACHE SYSTEM EMPLOYING ROUND-ROBIN REPLACEMENT AND EXCLUSIVE ACCESS

[75] Inventor: Robert E. Swenson, Mendota Heights, Minn.

[73] Assignee: Unisys Corporation, Blue Bell, Pa.

[21] Appl. No.: 172,529

[22] Filed: Dec. 23, 1993

[51] Int. Cl.$^6$ ................................................. G06F 12/08
[52] U.S. Cl. ........................... 395/457; 364/DIG. 1; 364/243.41; 395/460
[58] Field of Search ..................... 395/425, 403, 395/440–473; 364/200 MS File, 900 MS File

[56] References Cited

U.S. PATENT DOCUMENTS

| | | | |
|---|---|---|---|
| 4,195,343 | 3/1980 | Joyce et al. | 395/460 |
| 4,415,970 | 11/1983 | Swenson et al. | 395/425 |
| 4,445,174 | 4/1984 | Fletcher | 395/425 |
| 4,466,059 | 8/1984 | Bastian et al. | 395/250 |
| 4,499,539 | 2/1985 | Vosacek | 395/425 |
| 4,636,946 | 1/1987 | Hartung et al. | 395/463 |
| 5,263,142 | 11/1993 | Watkins et al. | 395/425 |
| 5,265,232 | 11/1993 | Gannon et al. | 395/425 |
| 5,276,835 | 1/1994 | Mohan et al. | 395/425 |

OTHER PUBLICATIONS

E. I. Cohen, et al., *Storage Hierarchies*, IBM Systems Journal, vol. 28, No. 1, 1989. pp. 62–76.

Primary Examiner—Matthew M. Kim
Attorney, Agent, or Firm—LeRoy Maunu; Charles A. Johnson; Mark T. Starr

[57] ABSTRACT

A cache management method in a cache system having a plurality of processors for managing the cache storage. Each of the processors may reserve portions of the cache storage which future allocation of cache storage may be expedited. All the processors begin searching for a portion of cache storage to allocate with the same starting portion of cache storage when processing cache commands in which the referenced data is not present in the cache storage. A processor will advance past the starting portion of cache storage when allocation of a portion of cache storage is necessary and another processor is currently using the starting portion of cache storage.

16 Claims, 3 Drawing Sheets

MULTIPROCESSOR SYSTEM WITH SCHEME FOR MANAGING ALLOCATION AND RESERVATION OF CACHE SEGMENTS IN A CACHE SYSTEM EMPLOYING ROUND-ROBIN REPLACEMENT AND EXCLUSIVE ACCESS

CO-PENDING PATENT APPLICATIONS

This patent application is related to the co-pending patent application Ser. No. 08/174,750 entitled, "Outboard File Cache System" to Thomas P. Cooper and Robert E. Swenson, which was filed Dec. 23, 1993, is assigned to the assignee of the present invention, and is herein incorporated by reference.

BACKGROUND OF THE INVENTION

1. Field of the Invention

This invention generally relates to cache storage in a multilevel data storage hierarchy and more particularly to management of the available cache storage in a cache system having a plurality of processors for managing the allocation of the cache storage.

2. Description of the Prior Art

The performance of data processing systems has improved dramatically through the years. While new technology has brought performance improvements to all functional areas of data processing systems, the advances in some areas have outpaced the advances in other areas. For example, advancements in the rate at which computer instructions can be executed have far exceeded improvements in the rate at which data can be retrieved from storage devices and supplied to the instruction processor. Thus, applications that are input/output intensive, such as transaction processing systems, have been constrained in their performance enhancements by data retrieval and storage performance.

The relationship between the throughput rate of a data processing system, input/output (I/O) intensity, and data storage technology is discussed in "Storage hierarchies" by E. I. Cohen, et al., IBM Systems Journal, 28 No. 1 (1989). The concept of the storage hierarchy, as discussed in the article, is used here in the discussion of the prior art. In general terms, the storage hierarchy consists of data storage components within a data processing system, ranging from the cache of the central processing unit at the highest level of the hierarchy, to direct access storage devices at the lowest level of the hierarchy. I/O operations are required for access to data stored at the lowest level of the storage hierarchy.

Caching takes place at various levels of the storage hierarchy. An instruction processor cache caches data stored in main memory and main memory essentially caches data stored in secondary storage. A second level cache between an instruction processor cache and the main memory is used in the 2200/900 Series dam processing system from Unisys Corporation. Secondary storage devices, such as disk subsystems, are also available with a cache between the electromechanical storage device and the main memory of data processing system.

The cache at each level of the hierarchy requires management logic to control the allocation of available cache storage. The cache management scheme chosen will impact the performance enhancement sought by caching. Two common cache replacement methods are used to select an entry in cache in which to store data when a cache miss is encountered. The round robin replacement method is simple to implement, however, the cache hit rate may suffer due to its simplicity. On the other hand, selecting the least-recently-used entry in the cache to replace may enhance the hit rate at the expense of operational complexity.

A round robin replacement scheme for a cache store is described in U.S. Pat. No. 4,195,343 to Thomas F. Joyce. The round robin method constitutes a first-in first-out policy for cache replacement. Implementation is simple because the logic need only cycle through the available cache store in selecting a location for replacement. A disadvantage to this method is that it ignores the possibility that once a location is referenced, is it likely to be referenced again. Therefore, it would be desirable not to replace recently referenced locations to avoid reading the data from storage and writing it to the cache store. The least-recently-used method addresses this concern.

U.S. Pat. No. 4,636,946 to Michael H. Hartung and Gerald E. Tayler describes the use of a least-recently-used method for cache replacement in a caching a disk storage apparatus. A list of the cache store locations is maintained and is ordered from least-recently-used to most-recently-used. Generally, when a location in the cache store is to be replaced, the least-recently-used location is selected. The disadvantage to this method is that each time a location in the cache store is referenced, the referenced location must be moved to the most recently used end of the ordered list of cache store locations.

Both Joyce and Hartung describe their respective cache management techniques in terms of a single processor managing allocation of the cache storage. When multiple processors have access to the cache storage and each of the processors may selectively allocate portions of the cache storage, both the conventional round robin and least-recently-used cache replacement techniques-may present processing bottlenecks. An example of a multi-processor cache system is described in the co-pending patent application incorporated by reference herein.

An example bottleneck in a multi-processor cache system is where two or more of the processors compete for access to the global variables or linkages used for allocating portions of cache storage. This competition would arise where the two or more processors have detected a cache miss condition and require allocation of cache storage to satisfy the request. In order to maintain the integrity of the global variables and linkages, only one of the processors can be allowed to update the global variables and linkages. This will result in all but one of the processors having to wait to allocate a portion of cache storage.

It would therefore be desirable to have a method for managing allocation of cache storage where processors competing for allocation of cache storage did not have to wait for one another in allocating storage.

SUMMARY OF THE INVENTION

It is an object of the invention to manage allocation of portions of cache storage with a method that is simple to implement and which minimizes waiting by the processors caused by the competition for allocation of the common resource.

Another object is to reserve portions of cache storage for each of the processors used to manage allocation of cache storage, whereby the portion of cache storage reserved by a processor is unallocable by the other processors and is immediately available for allocation by the processor which has reserved the portion of cache storage.

A further object of the invention is to minimize the waiting by a first processor seeking to allocate a portion of the cache storage when another processor is currently allocating a portion of cache storage.

According to the present invention, the foregoing and other objects and advantages are attained in a cache system having a plurality of allocable segments and a plurality of processors for allocating the plurality of allocable segments. Each of the processors allocates selected ones of the plurality of allocable segments, whereby data is stored in the allocated segments. A replacement candidate segment is established and is shared among the plurality of processors. When a processor requires allocation of a segment in cache storage, it begins with the replacement candidate segment. To minimize competition between the plurality of processors in seeking to allocate the replacement candidate segment, each of the processors, before allocation of a segment is necessary, reserves a segment for future use. A reserved segment is unallocable by the other processors and is immediately allocable by the processor which reserved the segment, thereby minimizing competition for the common replacement candidate segment.

In accordance with another aspect of the invention, competition for the shared replacement candidate segment is minimized. The plurality of allocable segments are considered for allocation in a predetermined order. If the replacement candidate segment is currently being considered for allocation by a first processor, another of the plurality of processors will consider a segment beyond the replacement candidate segment for allocation.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

The preferred embodiment of the present invention is described in terms of an Outboard File Cache as described in the co-pending patent application which has been incorporated herein by reference. It should be understood, and those skilled in the art will recognize that the present invention could be practiced in caches other than an Outboard File Cache. For example, the present invention could find applicability in disk cache systems and other caches.

The unit of storage allocation in the Outboard File Cache is a segment. A segment consists of 1792 words and for convenience corresponds to the unit of storage allocation for files by the 2200 Series Operating System from Unisys Corporation. Those skilled in the art will recognize that the present invention could be used with different units of storage allocation. For the purposes of this specification, each storage location which is allocable by the cache management processing is referred to as a "segment."

Figure 1:
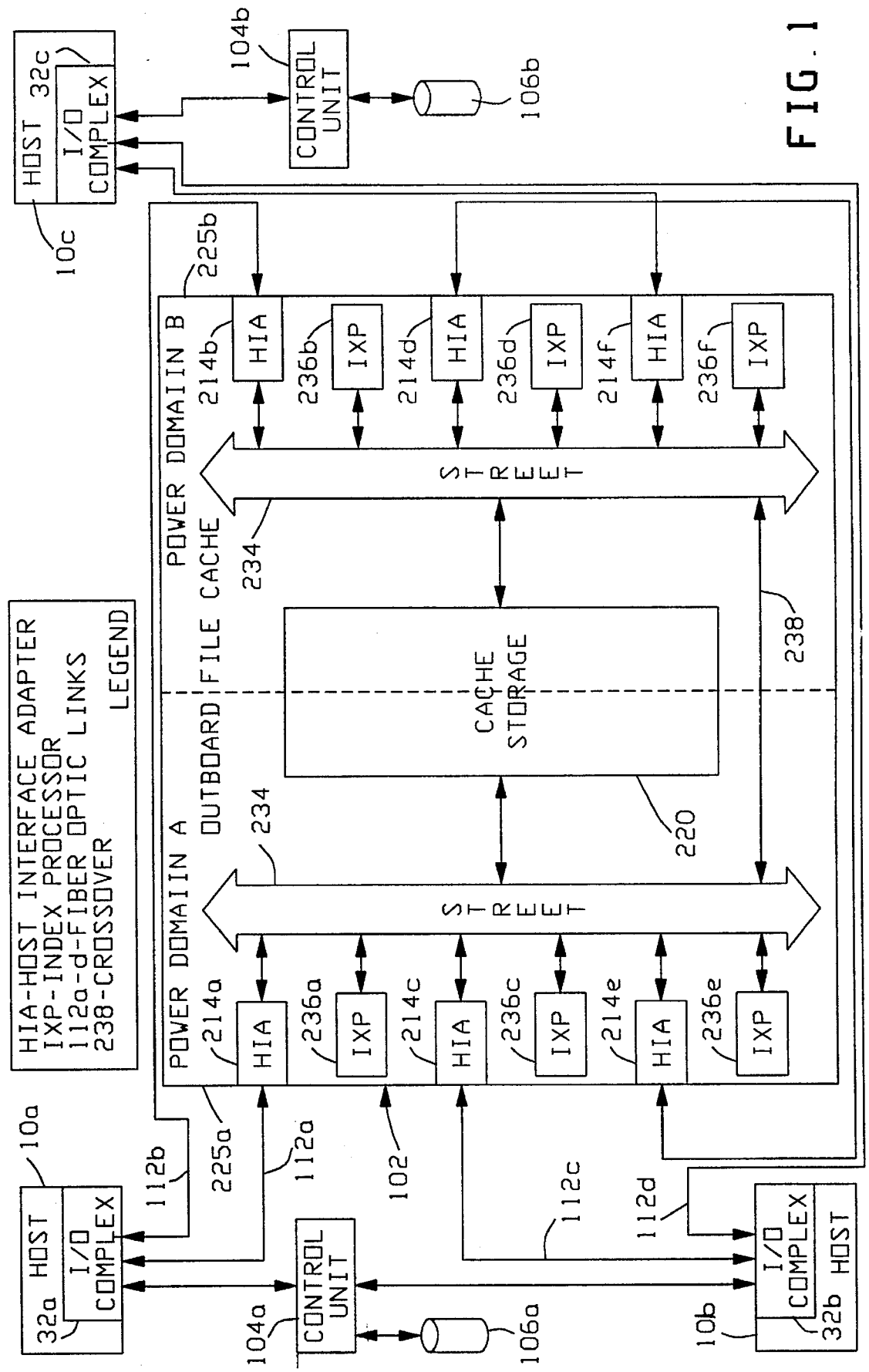
FIG. 1 is an block diagram illustrating a data processing configuration including a plurality of Hosts coupled to a Outboard File Cache, wherein the Cache Storage is managed by a plurality Index Processors.

FIG. 1 is an block diagram illustrating a data processing configuration including a plurality of Hosts 10 coupled to a Outboard File Cache 102, wherein the Cache Storage 220 is managed by a plurality of Index Processors. The exemplary configuration includes three Hosts 10a, 10b, and 10c. Each of the Hosts is coupled to a Control Unit 104, thereby providing access to one or more Disks 106. In the exemplary configuration, Hosts 10a and 10b share access to one or more Disks designated as 106a via Control Unit 104a. Host 10c has access to one or more Disks designated as 106b via Control Unit 104b.

The Outboard File Cache 102 provides cache storage for files stored on Disks 106. Cache Storage 220 in the Outboard File Cache contains a plurality of segments for storing file data. When a segment in Cache Storage is associated with a particular segment on a Disk, the segment is said to be "allocated".

For each Host 10, the Outboard File Cache 102 has two available Host Interface Adapters (HIAs) 214. The first HIA provided for a Host resides in Power Domain 225a, and the second HIA provided for a Host resides in Power Domain 225b. HIAs 214a and 214b provide access to the Outboard File Cache for Host 10a, wherein HIA 214a resides in Power Domain 225a, and HIA 214b resides in Power Domain 225b. The HIAs read file data from the Cache Storage 220 and send it to the coupled Host. The HIAs also write file data received from a Host to the Cache Storage. Fiber Optic Links 112a and 112b respectively couple HIAs 214a and 214b to their associated Data Movers (DMs) 110 (not shown) in the I/O Complex 32a. Similarly, HIAs 214c and 214d are provided for Host 10b, wherein Fiber Optic Links 112c and 112d couple the Host 10b to the Outboard File Cache. Host 10c is coupled to the Outboard File Cache in a similar fashion.

For each HIA 214a–f included in the exemplary configuration, an Index Processor (IXP) 236 is provided. It should be noted that any one of the Index Processors 236a–f may process commands sent through any one of the HIAs 214a–f. When an additional HIA is provided in the Outboard File Cache 102, an additional IXP is also added to provide extra processing capacity. Thus, any one of the IXPs 214a–f may interact with anyone of the HIAs 214a–f. For example, a cache command may be sent from Host 10a via Fiber Optic Link 112a and HIA 214a, and then processed by IXP 236f. All of the HIAs deposit cache commands in a shared Activity Queue 346 (not shown). Each of the IXPs query the Activity Queue for cache commands to process.

Cache Storage 220 includes multiple DRAM storage modules and provides the cache memory. Half of the storage modules are within Power Domain 225a and the other half are within Power Domain 225b. The data contained within the storage modules in Power Domain 225b reflects the data stored in storage modules within Power Domain 225a. Cache Storage 220 thereby provides for redundant storage of file data and the control structures used by the Outboard File Cache 102. The redundant storage organization provides for both single and multiple bit error detection and correction.

The Street 234 provides interprocessor communication between HIAs 214a–f and IXPs 236a–f, as well as data transfer capabilities between the Cache Storage 220 and the HIAs and IXPs. For each HIA-IXP pair in the configuration, there is an associated Crossover 238 for routing data and requests.

Index Processors (IXPs) 236a–f manage allocation and cache replacement for the Cache Storage 220, service file data access commands sent from. Host 10, and generally provide for overall file cache management. The IXPs contain microcode control for detecting whether the file data referenced in a cache command is present in the cache storage, and for managing and coordinating access to the cache memory.

Figure 2:
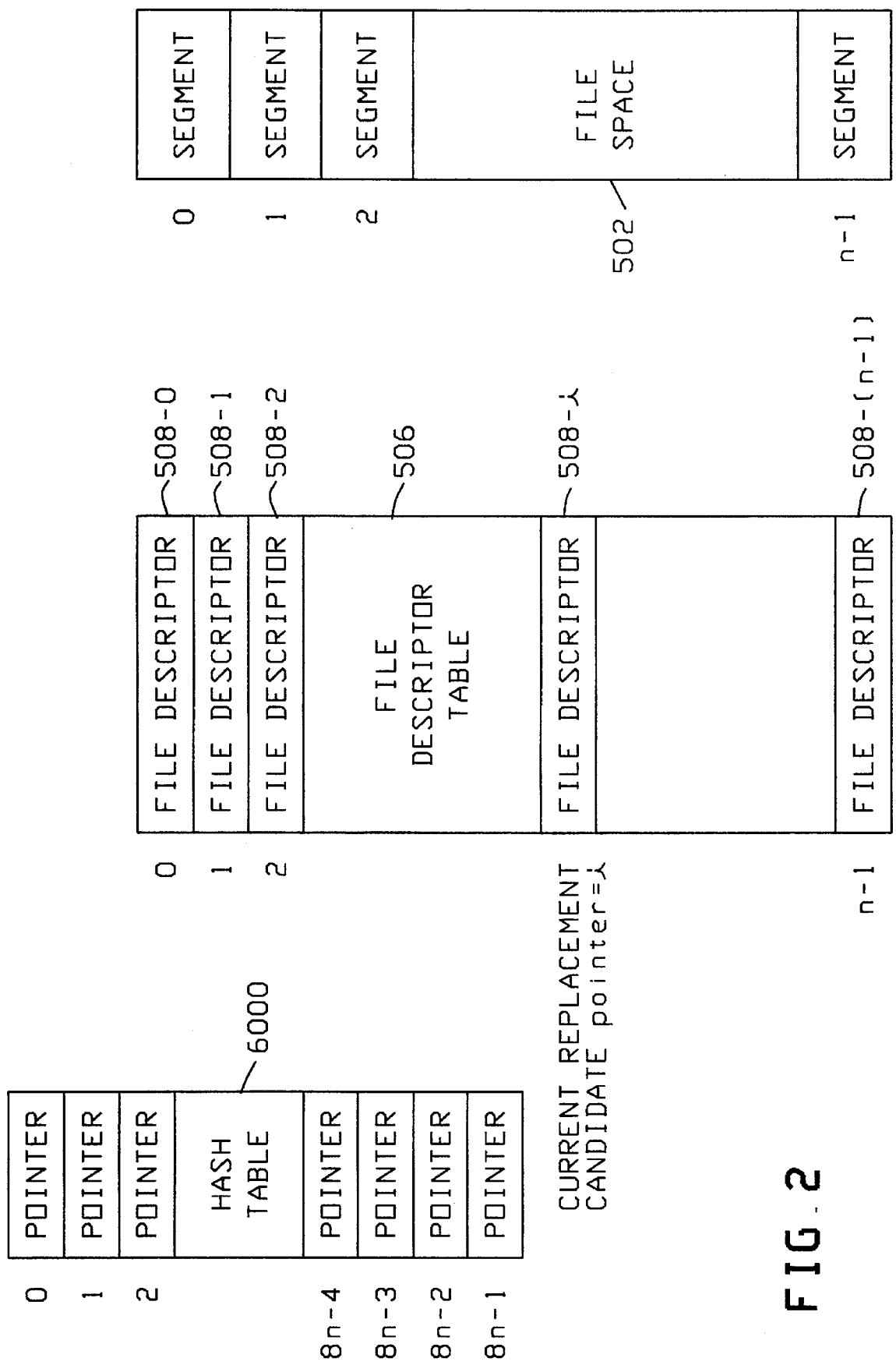
FIG. 2 illustrates logical block diagrams of the Hash Table, the File Descriptor Table, and File Space.

FIG. 2 illustrates logical block diagrams of the Hash Table 6000, the File Descriptor Table 506, and File Space 502. All of the Index Processors 236 have access to the Hash Table, File Descriptor Table, and File Space. File Space is a logical representation of the allocable segments in Cache Storage 220. There are n cache segments available in File Space 502, numbered consecutively as 0, 1, 2, ..., n–1. There are also n File Descriptors in the File Descriptor Table 506. The Hash Table 6000 is the structure that makes the File Space 502 fully associative. That is, a segment in the File Space 502 can be allocated without sensitivity to its address.

The Hash Table 6000 contains 8n entries. Each entry is available to point to one of the File Descriptors 508 in the File Descriptor Table 506. At system start-up time, the pointers in the Hash Table 6000 are null. An entry in the Hash Table is made to point to a File Descriptor when a segment in File Space 502 is assigned to a particular segment of a file. A reference to file data in a Command Packet 452 (not shown), or "cache command" is hashed to an entry in the Hash Table. The Hash Table points to the File Descriptor Table which in turn references a segment in File Space. The HASH_LINK field in the File Descriptor is used for data references which hash to the same entry in the Hash Table.

A round robin test-and-set cell contains the CURRENT REPLACEMENT CANDIDATE pointer which is used for selecting a segment in File Space 502 to allocate and is shared among the Index Processors 236. The File Descriptor 508-i referenced by the CURRENT REPLACEMENT CANDIDATE pointer is the first to be considered for allocation when an Index Processor finds that the data referenced in a cache command is not present in File Space. The associated segment is referred to as the "Current Replacement Candidate segment". An Index Processor may or may not allocate the Current Replacement Candidate segment, depending in part upon whether the segment has been recently referenced. The CURRENT REPLACEMENT CANDIDATE pointer proceeds in an incremental fashion around the File Descriptor Table. The File Descriptor Table is thereby used as a segment allocation list for maintaining the order in which segments are considered for allocation. When File Descriptor 508-(n–1) is reached, CURRENT REPLACEMENT CANDIDATE returns to File Descriptor 508-0.

Exclusive access to the HASH_LINKs, File Descriptors 508, and segments is governed by test-and-set cells associated with entries in the Hash Table 6000. For each group of eight entries in the Hash Table, there is an associated test-and-set cell. Exclusive access to a File Descriptor or segment is gained by performing a test-and-set on the test-and-set cell associated with the group of eight entries in the Hash Table by which the File Descriptor or segment is referenced. When a test-and-set cell is set, inter-IXP protocol limits access to all the File Descriptors and associated segments which are referenced by the group of eight entries in the Hash Table associated with the set test-and-set cell. Throughout this specification, reference may be made to "locking a segment", "locking a group of eight segments", or "locking a group of eight entries in the Hash Table". All should be understood to refer to successfully setting the appropriate test-and-set cell by which a group of eight Hash Table entries are covered.

Figure 3:
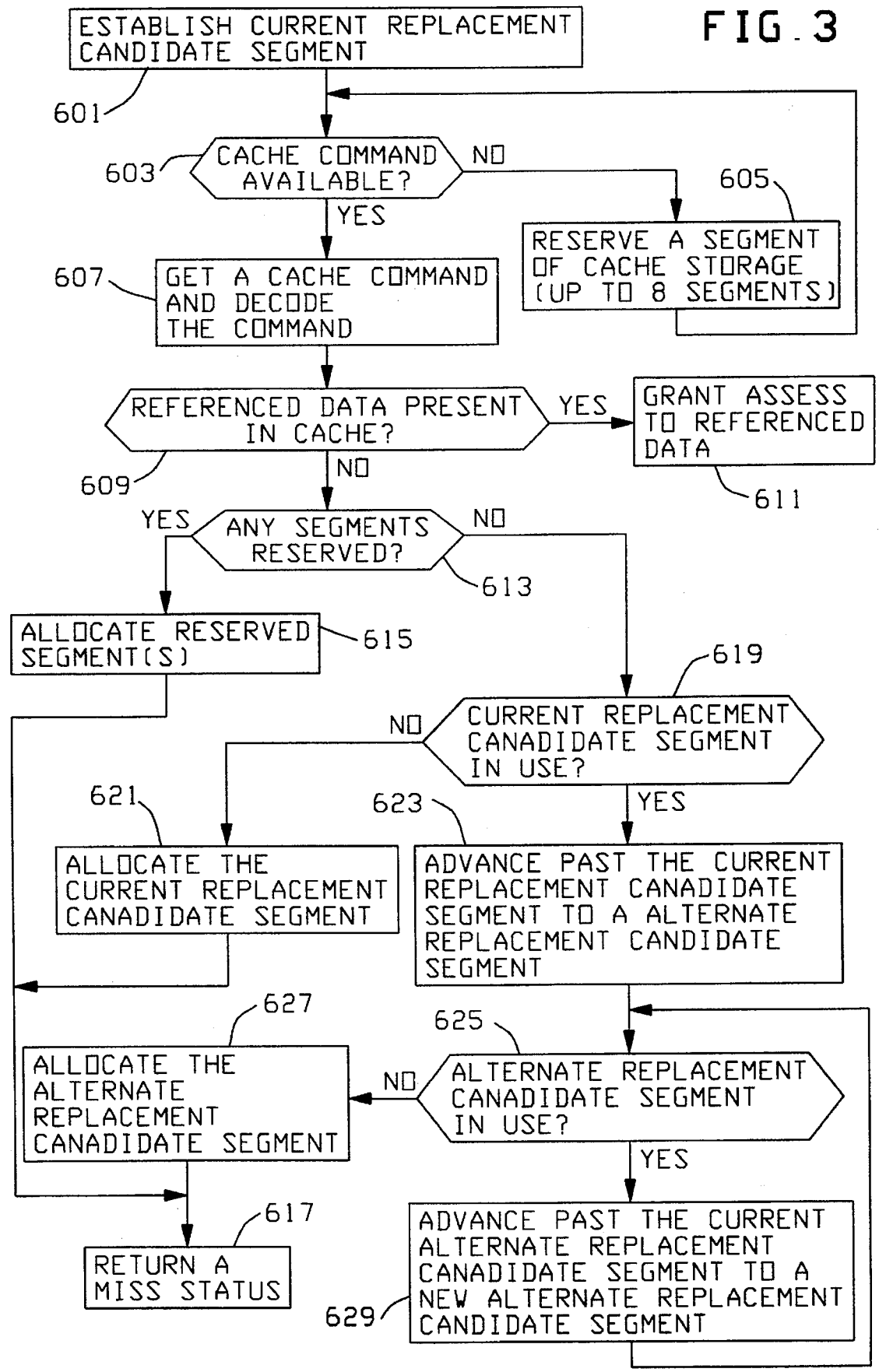
FIG. 3 is a flowchart of the overall processing flow for allocation of a segment in Cache Storage.

FIG. 3 contains a flowchart of the overall processing flow for allocation of a segment in Cache Storage. At system initialization time, Step 601 identifies an initial Current Replacement Candidate segment. This may be accomplished by letting the CURRENT REPLACEMENT CANDIDATE pointer reference File Descriptor 508-0 in the File Descriptor Table 506. All the Index Processors 236 use the CURRENT REPLACEMENT CANDIDATE pointer for selecting a segment to allocate when a cache miss is encountered.

Decision Step 603 tests whether a cache command is available. In the exemplary embodiment, cache commands are sent to the Outboard File Cache 102 in a Command Packet 452. Each of the HIAs 214 receives cache commands from the Host 10 to which it is coupled and the cache commands are deposited in an Activity Queue 346. Each of the Index Processors 236 obtains a cache command to process from the Activity Queue. While an Index Processor is waiting for a cache command to process, control is directed to Step 605 to reserve a segment for future allocation. Each of the Index Processors may reserve up to eight segments for future allocation. Additional segments are not reserved once eight segments have been reserved. In the general case, a segment is reserved by gaining exclusive access to the Current Replacement Candidate segment, via a test-and-set of the appropriate test-and-set cell, and allocating that segment for future use. The File Descriptor 508 for the reserved segment is marked as reserved by setting the PRE-USE flag in the File Descriptor 508. The CURRENT REPLACEMENT CANDIDATE pointer is advanced if the Current Replacement Candidate segment is allocated. In the preferred embodiment, the CURRENT REPLACEMENT CANDIDATE pointer is advanced from File Descriptor i to File Descriptor i+1. If exclusive access to the Current Replacement Candidate segment cannot be obtained, it should be understood that the processing of steps 623, 625, 627, and 629 may be performed as part of Step 605. Each of the Index Processors maintains a local reserved segment list identifying segments which it has reserved. Each entry in the reserved segment list identifies the File Descriptor associated with the reserved segment. Control is returned to decision Step 603 after a segment has been reserved. Reserving one or more segments eliminates having to reference the shared CURRENT REPLACEMENT CANDIDATE pointer when a cache command results in a miss, thereby minimizing conflicts and increasing system throughput.

Step 607 retrieves and decodes a cache command once a command becomes available. The data reference information in the cache command is hashed to an entry in the Hash Table 6000. If a File Descriptor 508 referenced by the Hash Table entry indicates that the referenced data is present in Cache Storage 220, decision Step 609 directs control to Step 611 where access is granted to the referenced file data. Otherwise, a cache miss has been detected and control is directed to decision Step 613.

An Index Processor performs decision Step 613 to determine whether it has any reserved segments available for allocation. If so, control is directed to Step 615 where a segment on the list of reserved segments is allocated for use by the cache command. In allocating a reserved segment, the data reference information in the cache command is stored in the File Descriptor of the reserved segment, the File Descriptor of the reserved segment is linked into the Hash Table 6000, and the reserved segment is removed from the list of reserved segments. Processing then proceeds to Step 617 where a miss status is returned to the Host 10 which issued the cache command.

Decision Step 613 directs control to decision Step 619 if the Index Processor 236 does not have any segments reserved for allocation. An Index Processor seeking to allocate the Current Replacement Candidate segment must first gain exclusive access to the round robin test-and-set cell and to the test-and-set cell in the Hash Table 6000 for the Current Replacement Candidate segment to ensure that another Index Processor will not attempt to read, write, or allocate the Current Replacement Candidate segment. If exclusive access to the round robin test-and-set cell and the Hash Table test-and-set cell for the Current Replacement Candidate segment are obtained, control is directed to Step 621 where the Current Replacement Candidate segment is allocated. In allocating the Current Replacement Candidate segment, the CURRENT REPLACEMENT CANDIDATE pointer is incremented, the data reference information in the cache command is stored in the File Descriptor 508-i, and the File Descriptor is linked to the appropriate entry in the Hash Table. A miss status is returned to the Host 10 at Step 617.

Control is directed to Step 623 if decision Step 619 detects that the round robin test-and-set cell is currently in use and exclusive access is unavailable. Step 623 obtains an Alternate Replacement Candidate segment by advancing a local pointer to the File Descriptor Table 506 128 File Descriptors 508 beyond the CURRENT REPLACEMENT CANDIDATE pointer. Decision Step 625 tests whether exclusive use of the Alternate Replacement Candidate segment may be obtained. If none of the other Index Processors 236 is currently using the Alternate Replacement Candidate segment, control is directed to Step 627 where the Alternate Replacement Candidate segment is allocated. The process of allocation of the segment is similar to that which was described for Steps 615 and 621.

If decision Step 625 finds that the Alternate Replacement Candidate segment is currently in use, the local pointer for the Alternate Replacement Candidate segment is advanced to the next entry in the File Descriptor Table 506. Control is returned to decision Step 625 to test whether the new Alternate Replacement Candidate segment is busy. Once exclusive access to the Alternate Replacement Candidate segment is obtained, allocation of the segment is performed at Step 627 as described above.

Having described the preferred embodiment of the invention in the drawings and accompanying description, those skilled in the art will recognize that various modifications to the exemplary embodiment could be made without departing from the scope and spirit of the claims set forth below:

That which is claimed is:

1. In a cache system having a plurality of allocable segments for storing cached data and a plurality of processors for managing allocation of the plurality of allocable segments, wherein the cache system searches the plurality of allocable segments for data referenced by cache commands and provides access to the referenced data if the referenced data is present in the plurality of allocable segments, a method for managing allocation of the plurality of allocable segments, the method comprising the steps of:

(a) establishing a replacement candidate segment, wherein said replacement candidate segment is shared among the plurality of processors and is the first one of the plurality of allocable segments to be considered for allocation if the referenced data is not present in the plurality of allocable segments;

(b) reserving said replacement candidate segment as a reserved segment before allocation of one of the plurality of allocable segments is required, wherein said reserved segment is reserved for future allocation by one of the plurality of processors and is made unavailable for allocation by others of the plurality of processors;

(c) selecting another one of the plurality of allocable segments for use as said replacement candidate segment after said reserving step;

(d) receiving a cache command by said one of the plurality of processors;

(e) allocating said reserved segment if the data referenced in said cache command from said receiving step is not present in the plurality of allocable segments and said reserved segment has been reserved;

(f) performing steps (g) and (h) if the data referenced in said cache command from said receiving step is not present in the plurality of allocable segments and said reserved segment has not been reserved;

(g) allocating said replacement candidate segment; and (h) selecting another one of the plurality of allocable segments for use as said replacement candidate segment.

2. The method of claim 1, wherein said reserving step (b) and said selecting step (c) are performed while waiting for a cache command.

3. The method of claim 1, wherein said reserving step reserves a plurality of reserved segments; and said allocating step (e) allocates one of said plurality of reserved segments.

4. The method of claim 1, wherein said reserving step (b) and said selecting step (c) are performed while waiting for a cache command;

said reserving step (b) reserves a plurality of reserved segments; and said allocating step (e) allocates one of said plurality of reserved segments.

5. In a cache system having a plurality of allocable segments for storing cached data and a plurality of processors for managing allocation of the plurality of allocable segments, wherein the cache system searches the plurality of allocable segments for data referenced by cache commands and provides access to the referenced data if the referenced data is present in the plurality of allocable segments, a method for managing allocation of the plurality of allocable segments, the method comprising the steps of:

(a) establishing a replacement candidate segment, wherein said replacement candidate segment is shared among the plurality of processors and is the first one of the plurality of allocable segments to be considered for allocation if the referenced data is not present in the plurality of allocable segments;

(b) receiving a cache command by one processor;

(c) requesting exclusive access to said replacement candidate segment if the data referenced in said cache command from said receiving step is not present in the plurality of allocable segments, wherein exclusive access is granted, only said one processor may allocate said replacement candidate segment;

(d) allocating said replacement candidate segment if exclusive access to said replacement candidate segment is obtained;

(e) selecting another one of the plurality of allocable segments for use as said replacement candidate segment after said allocating step (d);

(f) performing steps (g) through (j) if exclusive access to said replacement candidate segment from said requesting step (c) is not obtained;

(g) selecting another segment as an alternate replacement candidate segment;

(h) requesting exclusive access to said alternate replacement candidate segment, wherein if exclusive access is granted, only said one processor may allocate said alternate replacement candidate segment;

(i) allocating said alternate replacement candidate segment if exclusive access to said alternate replacement candidate segment from said requesting step (h) is obtained; and (j) repeating steps (g) through (i) until said alternate replacement candidate segment is allocated.

6. The method of claim 5, wherein said selecting step (e) selects a next addressable segment for use as said replacement candidate segment, wherein the plurality of allocable segments are considered round-robin for allocation; and said selecting step (g) selects the next addressable segment of use as said alternate replacement candidate segment.

7. In a cache system having a plurality of allocable segments for storing cached data and a plurality of processors for managing allocation of the plurality of allocable segments, wherein the cache system searches the plurality of allocable segments for data referenced by cache commands and provides access to the referenced data if the referenced data is present in the plurality of allocable segments, a method for managing allocation of the plurality of allocable segments, the method comprising the steps of:

(a) establishing a replacement candidate segment, wherein said replacement candidate segment is shared among the plurality of processors and is the first one of the plurality of allocable segments to be considered for allocation if the referenced data is not present in the plurality of allocable segments;

(b) receiving a cache command by one processor;

(c) requesting exclusive access to said replacement candidate segment if the data referenced in said cache command from said receiving step is not present in the plurality of allocable segments, wherein if exclusive access is granted, only said one processor may allocate said replacement candidate segment;

(d) allocating said replacement candidate segment if exclusive access to said replacement candidate segment is obtained;

(e) selecting a next addressable one of the plurality of allocable segments for use as said replacement candidate segment after said allocating step (d), wherein the plurality of allocable segments are considered round-robin for allocation;

(f) performing steps (g) through (k) if exclusive access to said replacement candidate segment from said requesting step (c) is not obtained;

(g) selecting a segment which is a predetermined number of addressable segments beyond said replacement candidate segment as an alternate replacement candidate segment;

(h) requesting exclusive access to said alternate replacement candidate segment, wherein if exclusive access is granted, only said one processor may allocate said alternate replacement candidate segment;

(i) allocating said alternate replacement candidate segment if exclusive access to said alternate replacement candidate segment from said requesting step (h) is obtained;

(j) selecting a next addressable segment after said alternate replacement candidate segment for use as said alternate replacement candidate segment if exclusive access from said requesting step (h) is not obtained; and (k) repeating steps (h) through (j) until said alternate replacement candidate segment is allocated.

8. In a cache system having a plurality of allocable segments for storing cached data and a plurality of processors for managing allocation of the plurality of allocable segments, wherein the cache system searches the plurality of allocable segments for data referenced by cache commands and provides access to the referenced data if the referenced data is present in the plurality of allocable segments, a method for managing allocation of the plurality of allocable segments, the method comprising the steps of:

(a) establishing a replacement candidate segment, wherein said replacement candidate segment is shared among the plurality of processors and is the first one of the plurality of allocable segments to be considered for allocation if the referenced data is not present in the plurality of allocable segments;

(b) reserving said replacement candidate segment as a reserved segment before allocation of one of the plurality of allocable segments is required, wherein said reserved segment is reserved for future allocation by one of the plurality of processors and is made unavailable for allocation by others of the plurality of processors;

(c) selecting another one of the plurality of allocable segments for use as said replacement candidate segment after said reserving step;

(d) receiving a cache command by one processor;

(e) allocating said reserved segment if the data referenced in said cache command from said receiving step (d) is not present in the plurality of allocable segments and said reserved segment has been reserved;

(f) performing steps (g) through (n) if the data referenced in said cache command from said receiving step is not present in the plurality of allocable segments and said reserved segment has not been reserved;

(g) requesting exclusive access to said replacement candidate segment if the data referenced in said cache command from said receiving stop (d) is not present in the plurality of allocable segments, whereby if exclusive access is granted, only said one processor may allocate said replacement candidate segment;

(h) allocating said replacement candidate segment if exclusive access to said replacement candidate segment is obtained;

(i) selecting another one of the plurality of allocable segments for use as said replacement candidate segment after said allocating step (h);

(j) performing steps (k) through (n) if exclusive access to said replacement candidate segment from said requesting step (g) is not obtained;

(k) selecting another segment as an alternate replacement candidate segment;

(l) requesting exclusive access to said alternate replacement candidate segment, whwrwin if exclusive access is granted, only said one processor may allocate said alternate replacement candidate segment;

(m) allocating said alternate replacement candidate segment if exclusive access to said alternate replacement candidate segment from said requesting step (l) is obtained; and (n) repeating steps (k) through (m) until said alternate replacement candidate segment is allocated.

9. The method of claim 8, wherein said reserving step (b) and said selecting step (c) are performed while waiting for a cache command.

10. The method of claim 9, wherein said reserving step (b) reserves a plurality of reserved segments; and said allocating step (e) allocates one of said plurality of reserved segments.

11. The method of claim 9, wherein said reserving step (b) and said selecting step (c) are performed while waiting for a cache command;

said reserving step (b) reserves a plurality of reserved segments; and said allocating step (e) allocates one of said plurality of reserved segments.

12. In a cache system having a plurality of allocable segments for storing cached data and a plurality of processors for managing allocation of the plurality of allocable segments, wherein the cache system searches the plurality of allocable segments for data referenced by cache commands and provides access to the referenced data if the referenced data is present in the plurality of allocable segments, a method for managing allocation of the plurality of allocable segments, the method comprising the steps of:

(a) establishing a replacement candidate segment, wherein said replacement candidate segment is shared among the plurality of processors and is the first one of the plurality of allocable segments to be considered for allocation if the referenced data is not present in the plurality of allocable segments;

(b) reserving said replacement candidate segment as a reserved segment before allocation of one of the plurality of allocable segments is required, wherein said reserved segment is reserved for future allocation by one of the plurality of processors and is made unavailable for allocation by others of the plurality of processors;

(c) selecting another one of the plurality of allocable segments for use as said replacement candidate segment after said reserving step;

(d) receiving a cache command by one processor;

(e) allocating said reserved segment if the data referenced in said cache command from said receiving step (d) is not present in the plurality of allocable segments and said reserved segment has been reserved;

(f) performing steps (g) through (o) if the data referenced in said cache command from said receiving step is not present in the plurality of allocable segments and said reserved segment has not been reserved;

(g) requesting exclusive access to said replacement candidate segment if the data referenced in said cache command from said receiving step is not present in the plurality of allocable segments, wherein if exclusive access is granted, only said one processor may allocate said replacement candidate segment;

(h) allocating said replacement candidate segment if exclusive access to said replacement candidate segment is obtained;

(i) selecting a next addressable one of the plurality of allocable segments for use as said replacement candidate segment after said allocating step (h), where,the plurality of allocable segments are considered round-robin for allocation;

(j) performing steps (k) through (o) if exclusive access to said replacement candidate segment from said requesting step (g) is not obtained;

(k) selecting a segment which is a predetermined number of addressable segments beyond said replacement candidate segment as an alternate replacement candidate segment;

(l) requesting exclusive access to said alternate replacement candidate segment, wherein if exclusive access is granted, only said one processor may allocate said alternate replacement candidate segment;

(m) allocating said alternate replacement candidate segment if exclusive access to said alternate replacement candidate segment from said requesting step (l) is obtained;

(n) selecting a next addressable segment after said alternate replacement candidate segment for use as said alternate replacement candidate segment if exclusive access from said requesting step (l) is not obtained; and (o) repeating steps (l) through (n) until said alternate replacement candidate segment is allocated.

13. In a cache system having a plurality of allocable segments for storing data referenced by cache commands issued to the cache system, a cache management apparatus comprising:

a segment allocation list, wherein said segment allocation list identifies an order of allocation of the plurality of allocable segments;

a replacement candidate pointer, wherein said replacement candidate pointer references an entry in said segment allocation list which identifies the first segment to be considered for allocation;

a plurality of cache management processors interfaced with said segment allocation list and said replacement candidate pointer, wherein each of said plurality of cache management processors includes a reserved segment list, wherein said reserved segment list identifies either one or more of the plurality of allocable segments which are reserved for allocation by one of said plurality of cache management processors;

reservation control interfaced with said segment allocation list, said replacement candidate pointer, and said reserved segment list, wherein said reservation control obtains exclusive use of said replacement candidate pointer, adds an entry identifying the segment referenced by said replacement candidate pointer to said reserved segment list, and advances said replacement candidate pointer to a next entry in said segment allocation list;

cache detection control responsive to cache commands and interfaced with the plurality of allocable segments, wherein said cache detection control detects whether the data referenced by a cache command is present in the plurality of allocable segments and generates a miss code if the data referenced is not present; and allocation control responsive to said miss code and interfaced with said reserved segment list, said segment allocation list, said replacement candidate pointer, wherein said allocation control selectively allocates either a segment identified by said reserved segment list or said segment allocation list if said miss code is detected.

14. In a cache system having a plurality of allocable segments for storing data referenced by cache commands issued to the cache system, a cache management apparatus comprising:

a segment allocation list, wherein said segment allocation list identifies an order of allocation of the plurality of allocable segments;

a replacement candidate pointer, wherein said replacement candidate pointer references an entry in said segment allocation list which is the first segment to be considered for allocation;

a plurality of cache management processors interfaced with said segment allocation list and said replacement candidate pointer, wherein each of said plurality of cache management processors includes cache detection control responsive to cache commands and interfaced with the plurality of allocable segments, wherein said cache detection control detects whether the data referenced by a cache command is present in the plurality of allocable segments and generates a miss code if the data referenced is not present; and allocation control responsive to said miss code and interfaced with said segment allocation list and said replacement candidate pointer, wherein said allocation control obtains exclusive access to said replacement candidate pointer and allocates the segment referenced by said replacement candidate pointer, wherein said allocation control further includes an alternate replacement candidate pointer, wherein said alternate replacement candidate pointer references an entry in said segment allocation list;

means for establishing said alternate replacement candidate pointer to reference an entry in said segment allocation list other than said replacement candidate pointer if exclusive access to said replacement candidate pointer is not obtained; and wherein said allocation control obtains exclusive access to said alternate replacement candidate pointer and allocates the segment referenced by said alternate replacement candidate pointer if exclusive access to said replacement candidate pointer is not obtained.

15. In a cache system having a plurality of allocable units of storage for storing cached data and a plurality of processors for managing allocation of the plurality of allocable units of storage, wherein the cache system searches the plurality of allocable units of storage for data referenced by cache commands and provides access to the referenced data if the referenced data is present in the plurality of allocable units of storage, a cache management apparatus comprising:

selection means for selecting a replacement candidate unit of storage, wherein said replacement candidate unit of storage is eligible for allocation by any one of the plurality of processors and is the first one of the plurality of allocable units of storage to be considered for allocation if the referenced data is not present in the plurality of allocable units of storage;

reservation means for reserving said replacement candidate unit of storage as a reserved unit of storage before allocation of one of the plurality of allocable units of storage is required, wherein said reserved unit of storage is reserved for future allocation by one of the plurality of processors and is made unavailable for allocation by others of the plurality of processors; and allocation means for allocating said reserved unit of storage to said one of the plurality of processors if the data referenced in a cache command is not present in the plurality of allocable units of storage and said reserved unit of storage has been reserved, and for allocating said replacement candidate unit of storage if the data referenced in said cache command is not present in the plurality of allocable units of storage and said reserved unit of storage has not been reserved.

16. The apparatus of claim 15, wherein said reservation means includes means for reserving a plurality of reserved units of storage.

* * * * *